United States Patent
Vallent

[15] 3,668,679
[45] June 6, 1972

[54] AUTOMATED ANALYZER OF MACHINE OPERATION

[72] Inventor: Martin A. Vallent, Stamford, Conn.

[73] Assignee: The United States of America as represented by the Secretary of the Navy

[22] Filed: Feb. 18, 1971

[21] Appl. No.: 116,426

[52] U.S. Cl. .................................340/267 R, 73/116
[51] Int. Cl. ........................................G01m 15/00
[58] Field of Search..................340/267 R, 269; 73/116

[56] References Cited

UNITED STATES PATENTS

| 3,436,753 | 4/1969 | Walker et al. | 340/267 R X |
| 3,522,532 | 8/1970 | McCoy | 73/116 X |
| 3,583,217 | 6/1971 | Howes | 73/116 X |

Primary Examiner—John W. Caldwell
Assistant Examiner—Michael Slobasky
Attorney—R. S. Sciascia and H. H. Losche

[57] ABSTRACT

An automatic analyzer of the operation of machinery having sensors coupling various machine components to produce electrical signals which sensor output signals are applied to the analyzer in accordance with a program of sampling by a taped program controlling relay switches to compare the voltage amplitude of an electrical signal from the machine component or to compare the harmonics of noise from the machine component with a predetermined reference to shut down the analyzer to further sampling and to indicate a fault whenever the machine component signal is in excess of the reference until the fault is corrected.

7 Claims, 2 Drawing Figures

INVENTOR.
MARTIN A. VALLENT

AUTOMATED ANALYZER OF MACHINE OPERATION

BACKGROUND OF THE INVENTION

Malfunction detection systems are known and automatic malfunction detection systems are in use to detect engine or motor operation malfunctions or out-of-balance of rotating bodies. With the increase in use of higher speed machinery there is the constant need in improvements in high speed automatic sensing means to detect deviations of machine operation from its standard operation. The first types of malfunction detection equipments were by manual switching of sample circuits which gave way to the automatic. The automatic systems reduced the operation time required to monitor the samples, virtually eliminated the human error associated with the setting of the necessary controls for monitoring a particular machine component, and reduced the skill required by the operator to correctly interpret the data. The invention greatly improves the automatic interpretation of malfunctions and the indication of the malfunctioning part.

SUMMARY OF THE INVENTION

In the present invention a diode matrix is coupled to the outputs of electrical contacts through electromagnetic latching relay coils to an electrical supply which electrical contacts are made in accordance with a program set up on a tape, such as a paper tape. A clock source is coupled to initiate actuation of relay switches to start a sampling operation by starting a commutator to produce circuits sequentially through the diode matrix in accordance with the taped program of electrical contacts to connect machine components to be sampled in sequence, such as the several components of a sonic or jet engine. Comparator circuits with reference potentials are also programmed and any improper comparison will denote a fault which will activate circuitry to shut down further sampling until the fault is corrected or the machine component eliminated from the series of sampling. It is accordingly an object of this invention to provide an automatic malfunction detector and analyzer system that programs a sampling sequence and indicates any malfunctioning component coupled for monitoring component operation.

BRIEF DESCRIPTION OF THE DRAWING

These and other objects and the attendant advantages, features and uses will become more apparent to those skilled in the art as a more detailed description proceeds when considered along with the accompanying drawings in which.

DESCRIPTION OF THE PREFERRED EMBODIMENT

FIGURE 1

Figure 1:
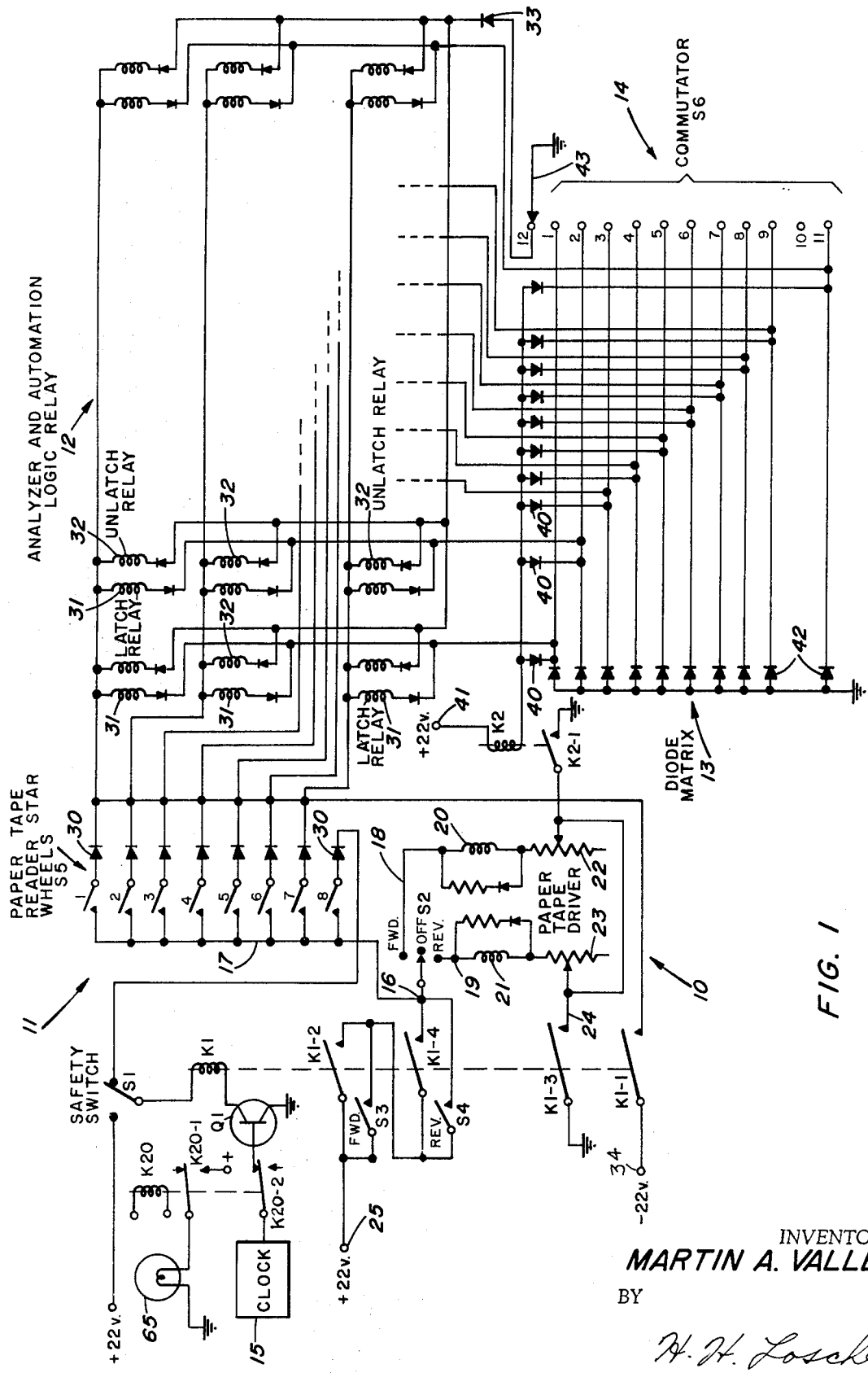
FIG. 1 is a circuit schematic drawing of one part of the invention.

Referring more particularly to FIG. 1, the circuit schematic shows the components of a paper tape driver 10 which drives a paper tape (not shown) over a paper tape reader 11 which establishes circuits through an analyzer and automation logic relay circuit or matrix 12 to a diode matrix 13, the outputs of which are to a commutator 14.

The paper tape driver 10 is initiated in its operation from a clock pulse source 15 through a relay switch K20, later to be more fully described, to the base of a transistor Q1 having its collector coupled through the relay coil of a relay switch K1 to a voltage source and its emitter coupled to ground. The collector through the electromagnetic coil of K1 is to a safety switch S1 which may be alternately switched right or left, the left contact being directly to a voltage source, herein shown for the purpose of example as being 22 volts. The relay K1 controls switches K1–1 through K1–4. Switches K1–2 and K1–4 are in series and switch K1–2 has the switch blade thereof coupled to a 22 volt source at terminal 25, the output of K1–4 being to a terminal 16. Terminal 16 is coupled to a switch blade of a switch S2 and also to a branch conductor 17 coupled in common to one contact each of a plurality of contacts in parallel in a star wheel paper tape reader consisting of switches S5–1 through S5–8. The switch S2 is switchable from its central off position to either contact 18 for the forward tape driving condition or contact 19 for the reverse tape drive condition. Contact 18 is coupled through an electromagnetic tape driver coil 20 while the reverse contact 19 is coupled through an electromagnetic paper tape driver coil 21. The driver coils 20 and 21 are each coupled through the adjustable taps of potentiometers 22 and 23, respectively, to the contact 24 of the relay switch K1–3, the switch blade of which is grounded. Manual switches S3 and S4 are placed in parallel to switches K1–2 and K1–4 for forward or reverse paper tape driver interruption of the circuit. Whenever the switch S2 is positioned to either the forward or reverse contacts 18 or 19 and the relay K1 is energized, the respective coil 20 or 21 will be energized to cock the paper tape driver mechanism so that when the relay switch K1 is de-energized the paper tape will be advanced one position. The circuit for the paper tape driver is from the 22 volt source at terminal 25 to ground through the K1–3 relay switch.

The paper tape reader 11 includes a star wheel reader which makes contact as illustrated herein by switches S5–1 through S5–8 whenever the paper tape provides a hole to make electrical contact through the tape, illustrated by these S5 switches. Each switch output is through a diode 30 oriented to pass positive voltages into the analyzer and automation logic relay circuit 12 with the exception of switch S5–8 which is through a similar diode 30 to the right hand contact of switch S1. Whenever the forward and reverse switches S3 and S4 are closed for operation, the paper tape would have holes or punchings to place switch S5–8 in contact to apply the voltage at terminal 25 to the K1 energization coil via S3, S4, 16, S5–8, 30, S1 and K1 to ground whenever transistors Q1 is placed into conduction by the clock source 15. Whenever it is desirable for the purpose of safety against improper contact of switch S5–8, switch S1 may be placed to the left hand contact.

The analyzer and automation logic relay circuit includes a plurality of latching relay energization coils 31 coupled in parallel output from the switch S5–1 to the diode matrix 13 and commutator S6–1 through S6–11 and in series from S5–1 through S5–8 to S6–1 and from S5–1 through S5–8 to S6–2, etc., throughout S6–11. Each latching relay energization coil 31 is paralleled by an unlatching relay energization coil 32 coupled in series from each of the switch outputs of S5–1 through S5–8 through a diode 33 to contact 12 of the commutator switch S6. The movable contact 43 of commutator S6 is coupled directly to ground such that when the commutator is connected to S6–12 all unlatching energization coils 32 are energized to unlatch the energization coils 31 in the network of the analyzer and automatic logic relay 12 by the circuit from a –22V source at terminal 34 through switch K1–1.

The diode matrix 13 consists of diodes 40 coupled with the anodes in parallel to a 22 volt source 41 through the energization coil of a relay K2. The cathodes of each of the diodes 40 are coupled in sequence to the commutator switch contacts S6–1 through S6–9 and S6–11. Another set of diodes 42 are anode coupled in common to ground while the cathodes are respectively to the commutator contacts S6–1 through S6–9 and S6–11. The relay K2, in control of switch contacts K2–1, couples the adjustable taps of the potentiometers 22 and 23 to ground in the closed contact position. By this arrangement when either relay switch K1–3 or K2–1 is closed, the paper tape driver coil 20 or 21, depending on the forward or reverse position of switch S2, will be cocked and on the opening of either K2–3 or K2–1 the paper tape will be advanced one and at the same time the commutator of S6 will be advanced one. For example, upon the energization and de-energization of either coil 20 or 21 the paper tape (not shown) will be driven over the paper tape reader switches S5–1 through S5–8 by one position as from S5–1 to S5–2, S5–2 to S5–3, etc., at the same time that the movable contact 43 of commutator S6 will be advanced one as from 12 to 1, 1 to 2, etc.

OPERATION OF FIGURE 1

In the operation of FIG. 1 let it be assumed that switches S3 and S4 are closed and the paper tape is in a position to close switch S5-8 placing a voltage on the collector of transistor Q1. Let it also be assumed that switch S2 is in the "forward" contact 18 position. When a pulse of the clock pulse source 15 is applied to the base of transistor Q1, relay K1 will be energized closing all switches K1-1 through K1-4. Closing of switch K1-1 unlatches all latched relays by the circuit from terminal 34, K1-1, all coils 32, 33, and S6-12 to ground. The closing of K1-3 also energizes coil 20 cocking the paper tape driver by the circuit 25, K1-2, K1-4, S2, 18, 20, 22, 24, and K1-3 to ground. This will advance the paper tape (not shown) one position and advance commutator contact 43 to position one when the clock pulse is terminated and Q1 is deenergized. With contact 43 on switch S6-1 a circuit is established from the voltage source 41 through the coil of relay K2 to ground closing switch K2-1 and again cocking the paper tape driver which will become de-energized at the opening of commutator contacts 1 and 43. This energizing and de-energizing of the relay K2 as the commutator 43 passes over the contacts S6-1 through S6-9 will continue in sequence until 43 rests on the contact S6-10. As the commutator is driven down over the contacts the latching relay coils 31 will be energized to control switches, as will later become clear in the description of FIG. 2, in accordance with the program established in the paper tape driven over the paper tape reader switches S5-1 through S5-8. The commutator movable contact 43 will rest on contact 10 until another clock pulse from clock source 15 reactivates Q1 and energizes K1 to drive the commutator to its contact S6-11. The momentary pause between the stepping of the commutator from S6-10 to S6-11 provides the time delay before data enters the loop. When the commutator is advanced to S6-11, a D. C. voltage proportional to the amplitude of the signal of a particular engine component to be analyzed enters the automation loop soon to be described in FIG. 2. Again relay K2 becomes effective to drive the commutator on to contact 12. This establishes the condition set out in the opening statement of operation so that the next clock pulse from clock pulse source 15 will again start the process as hereinabove described.

FIGURE 2

Figure 2:
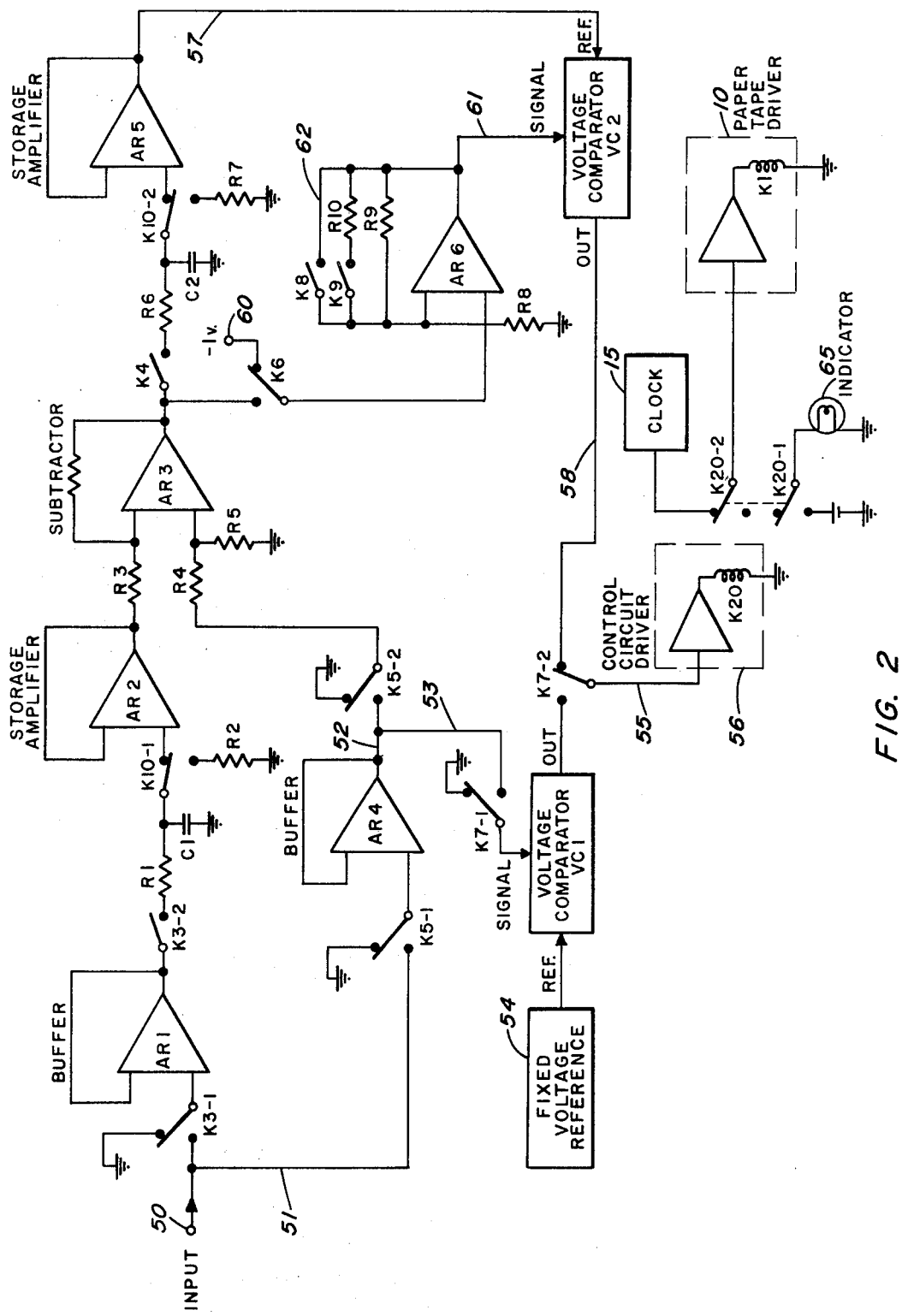
FIG. 2 is a block circuit schematic of another part of the invention with common elements bearing the same reference characters.

Referring more particularly to FIG. 2, a signal input 50 is coupled to the contact of a relay switch K3-1 which normally rests on a grounded contact. The switch blade of K3-1 is coupled as one input to a buffer amplifier AR1. Contact 50 is also coupled by branch conductor 51 to the contact of a relay switch K5-1, the switch blade of which normally rests against a grounded contact. The switch blade of K5-1 is applied as one input to a buffer amplifier AR4. The output of buffer amplifier AR1 is through a relay switch K3-2 through a resistance R1 and the switch blade of a relay switch K10-1 as a second input to a storage amplifier AR2. The switch blade of the relay K10-1 is coupled to one plate of a storage capacitor C1, the opposite plate of which is grounded. A second normally open contact of the relay switch K10-1 is through a resistor R2 to ground. The output of the storage amplifier AR2 is through a resistor R3 as one input to a subtractor amplifier AR3. The output of the buffer amplifier AR4 is by way of conductor 52 to one contact of a relay switch K5-2, the relay switch blade normally resting on a ground contact. This conductor 52 through the switch K5-2 is through a resistor R4 as a second input to the subtractor amplifier AR3. This input of AR3 is also biased through a resistor R5 to ground. The conductor 52 on the output of AR4 is coupled by a branch conductor 53 to one contact of a relay K7-1, the normal position of this relay resting on a grounded contact. The conductor 53 is coupled as one input to a voltage comparator VC1, a second input being from a fixed voltage reference 54. The output of the VC1 is to a normally open contact of a relay switch K7-2, the switch blade of which is coupled by way of a conductor means 55 to a control circuit driver 56, the output of which is through a relay energization coil K20 to ground, this relay coil K20 also being shown in FIG. 1 as controlling switches K20-1 and K20-2.

The output of the subtractor amplifier AR3 is to the switch blade of a relay K4 and also to a normally open contact of a relay switch K6. The normally open switch of relay K4 is through a resistor R6 to the switch blade of K10-2, a normally closed contact of which is an input to a storage amplifier AR5. The switch blade of K10-2 is coupled to one plate of a storage capacitor C2, the opposite plate of which is grounded and the normally open contact of K10-2 is through a resistor R7 to ground. The output 57 of AR5 is coupled as one input to a second voltage comparator VC2, the output of which is through a conductor 58 to the normally closed contact of relay switch K7-2. The switch blade of the relay K6 normally rests on a contact coupled to a terminal 60, herein shown to be −1 volt, and is coupled as one input to an amplifier AR6. The second input to amplifier AR6 is biased through a resistor R8 to ground and is also coupled in feedback through a resistor R9 to the output 61 coupled as the second input to the voltage comparator VC2. Coupled in parallel to the resistor R9 is a resistor R10 through a relay switch K9 and also directly coupled in parallel by conductor 62 through the relay switch K8. The control circuit driver 56 controlling the relay K20 controls the switches K20-1 and K20-2. Energization of K20 closes switch K20-1 to close a circuit through indicator lamp 65, also shown in FIG. 1. In like manner energization of K20 opens switch K20-2 breaking the clock circuit to the paper tape driver 10 for relay K1, as shown in FIG. 1 also.

All of the relays shown and described in FIG. 2 are latching relays controlled by the latching relay coils 31 shown in FIG. 1. Whenever relays K10-1 and K10-2 are energized the respective storage capacitors C1 and C2 are discharged through the resistors R2 and R7, respectively. Relay switches K3, K5, and K7 normally rests in their grounded or discharged condition.

OPERATION OF FIGURE 2

In the operation of FIG. 2 let it be assumed that the circuit of FIG. 1 is operative to first start operation by a clock pulse to drive the paper tape and the commutator setting up the energization of certain latching relays 31 in accordance with the reading of paper tape driven over the paper tape reader 11. These latching relays will latch several relays in FIG. 2 in a prescribed order soon to be described and also latch certain relays for circuits of sensors from components of engines to terminal 50 to be sampled or analyzed as from the cylinder heads, bearing positions, compressor balance, and other mechanical functioning parts of a high speed engine such as sonic or jet engine components. Analyzing malfunction in such jet or sonic engines requires the monitoring of two distinct types of signals. In the first type, such as that produced by bearings, the analyzer is required to just monitor the amplitude of the signal above the noise background. The second type is produced by components that generate sidebands and/or harmonics of the normal component frequency with respect to the amplitude of the so-called carrier frequency. Compressor unbalance is a classic example of this type of spectrum since unbalance is characterized by high amplitude sidebands.

In the first type let it be assumed that the operation of FIG. 1 will cause tape reading and sequence of the commutator switch S6 latching relays K5-1, K7-1, and K7-2 to operate in conjunction with the latching relay to place a sensor of bearing noise input on the input 50 which couples this signal of bearing noise to the voltage comparator VC1. This circuit is from input 50, K5-1, AR4, 52, 53, and K7-1 to VC1. The amplitude of this bearing noise is then compared to a fixed voltage reference from 54. If the bearing noise sensor voltage signal is above the reference voltage signal, the comparator VC1 is turned "on" providing a step input to the control circuit driver 56 energizing relay K20 breaking the circuit to the base of transistor Q1 and illuminating the indicator lamp 65.

This lamp indication will remain until the fault is corrected or checked so that operating personnel will know that a high degree of bearing noise is occurring in the jet or sonic engine, for example. If such bearing noise or other noise from other components is circuited from its sensor to the input terminal 50 by the latching relays, each component of the jet engine or sonic engine is analyzed by this first type of comparison with the fixed voltage 54 and will shut down the analyzer circuit and light the indicator 65 for every component which has excessive noise or vibration.

In the sideband or harmonic type signal analyzation, the paper tape is programmed to monitor an electrical signal from the sensor for the ambient noise in the vicinity of an engine component and switches K3–1 and K3–2 are closed by the respective latching relays 31 in FIG. 1 to monitor this ambient noise sensor signal applied at terminal 50 to charge capacitor C1. Capacitor C1 is then charged up to a D. C. level corresponding to this ambient noise equivalent in the electrical signal from the sensor. Switches K3 are opened allowing the voltage on C1 to be stored in AR2. Switches K5–1 and K5–2 are now closed by the programmer in FIG. 1 allowing the sensor signal for this component to enter the loop. The component sensor signal on terminal 50 thus appears at one input to the subtractor amplifier AR3 and the ambient noise electrical signal equivalent appears on the other input to AR3. The output of AR3 is thus the difference between the two D. C. levels, i.e., it is the actual amplitude of the sensor signal above the noise signal. If this signal corresponds to the "carrier," switch K4 is closed thereby charging up capacitor C2 to a D. C. level corresponding to the true amplitude of the "carrier." K4 is then opened storing this information in the storage amplifier AR5. This D. C. level now forms the reference input for the voltage comparator VC2. If the signal at the output of AR3 corresponds to a sideband or a harmonic of a particular engine component sensor signal applied to terminal 50, K6 is closed allowing the output of AR6 to provide the signal input to VC2 via conductor 61. Switches K8 and K9 are provided to vary the gain of AR6 in order to skew the signal to a level appropriate for monitoring the engine component in question to be analyzed. If the amplitude of the sideband or harmonic signal is greater than a predetermined percent of the "carrier" amplitude, the voltage comparator VC2 will turn "on" thus providing a step to the control circuit driver 56 which will light the indicator 65 and open the loop to stop the process of tape and commutator drive in FIG. 1. Thus various engine components can be analyzed in their noise or their harmonics and sideband outputs to be determined whether they are excessive to engine operation to provide an indication to the operators thereof.

While other modifications may be constructed in accordance with the spirit of this invention, I desire to be limited in the scope of my invention only by the limits of the appended claims.

I claim:
1. An automatic analyzer of machine operation comprising:
   a diode matrix having one set of diodes coupled in common between a voltage source through a first relay coil and commutator taps, respectively, and another set of diodes coupled in common between a fixed potential and said commutator taps, respectively;
   a matrix of latching relay coils coupled between said voltage source through tape reader contacts and said diode matrix;
   a commutator including said commutator taps to commutate said one set of diodes in sequence to said fixed potential;
   a paper tape driver having forward and reverse energization coils for driving a programmed paper tape over said reader contacts;
   a clock pulse source having an output through first switch means;
   a relay switch having a second relay coil in circuit with said first switch means, said relay switch having relay contacts circuiting a voltage source with said forward and reverse energization coils and circuiting a signal input to said tape reader contacts;
   a comparator circuit means coupled to said signal input through said relay switch contacts to compare input signals with reference signals to produce an output fault signal whenever the input signal exceeds the reference signal; and
   a fault relay coupled to the output of said comparator circuit means with contacts in the coupling of said clock pulse source to break the circuit to said relay switch during a fault whereby several input signals to be analyzed are switched by said latching relays to said input in accordance with a taped program operating said contacts and the control established by said commutator, any fault occurring being operative to shut down further analysis operation until the fault is corrected.

2. An automatic analyzer of machine operation as set forth in claim 1 wherein
   said comparator circuit means includes two loops, each loop including a comparator the outputs of which are alternately switched through one of said latching relays to said fault relay whereby said latching relays establish signal input in the selected loop for analysis.

3. An automatic analyzer of machine operation as set forth in claim 2 wherein
   said reference signal coupled to one of said loop comparators is a fixed voltage reference to compare with the voltage amplitude of said input signal, and said reference signal coupled to the other of said loop comparators is the summed frequency sidebands and harmonics of said input signal producing an amplitude of voltage that is compared with the carrier frequency amplitude of said input signal.

4. An automatic analyzer of machine operation as set forth in claim 3 wherein
   said fault relay includes contacts to place an indicator in circuit upon actuation by a fault signal.

5. An automatic analyzer of machine operation as set forth in claim 4 wherein
   said tape driver forward and reverse energization coils are adaptable to drive a tape over eight said tape reader contacts, each tape reader contact being coupled to said latching relays respectively through a diode, each latching relay being paralleled by an unlatching relay coupled in one commutator position to said fixed potential and in one contact position of said relay switch to a voltage source to place said unlatching relays in circuit.

6. An automatic analyzer of machine operation as set forth in claim 5 wherein
   said first switch means includes a transistor switch in circuit with said relay switch and said contacts in the coupling of said clock pulse source, the latter contacts being the contacts of said fault relay.

7. An automatic analyzer of machine operation as set forth in claim 6 wherein
   said relay switch having relay contacts circuiting a voltage source with said forward and reverse energization coils includes a selector switch to select the energization of the forward and reverse coils.

* * * * *